United States Patent
Mandal et al.

(10) Patent No.: US 9,608,819 B1
(45) Date of Patent: *Mar. 28, 2017

(54) LEARNING PARITY WITH NOISE-BASED RELATIONAL ENCRYPTION FOR PROXIMITY RELATIONS

(71) Applicant: FUJITSU LIMITED, Kawasaki-shi, Kanagawa (JP)

(72) Inventors: Avradip Mandal, San Jose, CA (US); Arnab Roy, Santa Clara, CA (US); Hart Montgomery, Redwood City, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,713

(22) Filed: May 2, 2016

Related U.S. Application Data (63) Continuation-in-part of application No. 14/797,025, filed on Jul. 10, 2015, which is a continuation-in-part
(Continued)

(51) Int. Cl.
| | |
|---|---|
| *H04L 29/06* | (2006.01) |
| *H04L 9/30* | (2006.01) |

(Continued)

(52) U.S. Cl.
CPC ............ *H04L 9/304* (2013.01); *H04L 9/0618* (2013.01); *H04L 9/0861* (2013.01); *H04L 9/3247* (2013.01); *H04L 63/0861* (2013.01)

(58) Field of Classification Search
CPC .. H04L 63/0861; H04L 63/0884; G06F 21/32
See application file for complete search history.

(56) References Cited

U.S. PATENT DOCUMENTS

| | | | |
|---|---|---|---|
| 2011/0113241 A1* | 5/2011 | Umezawa | G06F 21/606 713/156 |
| 2011/0179289 A1* | 7/2011 | Guenther | G06F 21/32 713/189 |

(Continued)

OTHER PUBLICATIONS

Dabbah, M. A., Dlay, S. S., & Woo, W. L (Apr. 2008). PCA Authentication of Facial Biometric in the Secure Randomized Mapping Domain. In Information and Communication Technologies: From Theory to Applications, 2008. ICTTA 2008. 3rd International Conference on (pp. 1-5). IEEE.

(Continued)

*Primary Examiner* — Mohammed Waliullah
(74) *Attorney, Agent, or Firm* — Maschoff Brennan (57) ABSTRACT

A method includes receiving a first and a second linearity ciphertexts representative of a first and second biometric templates, respectively that are encrypted using a relational linearity encryption scheme (linearity scheme). The linearity scheme is based on learning parity with noise. The method includes discovering a linearity relationship between the first and the second linearity ciphertexts. The method includes receiving a first and a second proximity hash value representative of the first and second biometric templates, respectively encrypted using a relational proximity hash scheme (proximity scheme). The proximity scheme is based on the linearity scheme and an error correcting code. The method includes detecting a proximity between the first and the second proximity hash value in terms of a Hamming distance. The method includes authenticating an identity of a user based on the proximity and the linearity relationship.

20 Claims, 4 Drawing Sheets

Related U.S. Application Data of application No. 14/287,051, filed on May 25, 2014, now Pat. No. 9,503,266.

(51) Int. Cl.
*H04L 9/06* (2006.01)
*H04L 9/08* (2006.01)
*H04L 9/32* (2006.01)

(56) References Cited

U.S. PATENT DOCUMENTS

| | | | | |
|---|---|---|---|---|
| 2013/0174243 | A1* | 7/2013 | Inatomi | H04L 9/3231 726/7 |
| 2013/0212645 | A1* | 8/2013 | Takahashi | H04L 9/3231 726/3 |

OTHER PUBLICATIONS

N. K. Ratha, J. H. Connell, and R. M. Bolle, "Enhancing security and privacy in biometrics-based authentication systems," IBM systems Journal, vol. 40, pp. 614-634, 2001.
R. Belguechi, E. Cherrier, C. Rosenberger, and S. Ait-Aoudia, "An integrated framework combining Bio-Hashed minutiae template and PKCS15 compliant card for a better secure management of fingerprint cancelable templates," Elsevier Advanced Technology Publications. Nov. 2013, Computers and Security , vol. 39, Sec, 3.3.
A. Juels and M. Sudan, "A fuzzy vault scheme," IEEE International Symposium on Information Theory, pp. 408, 2002.
Ari Juels and Martin Wattenberg. A fuzzy commitment scheme. In ACM CCS 99, pp. 28-36. ACM Press, Nov. 1999.
Ari Juels and Madhu Sudan. A fuzzy vault scheme. Cryptology ePrint Archive, Report 2002/093, 2002. http://eprint.iacr.org/20021093.
R. Belguechi, C. Rosenberger, and S. Aoudia, "Biohashing for securing minutiae template," in Proceedings of the 20th International Conference on Pattern Recognition, Washington, DC, USA, 2010, pp. 1168-1171.
Yevgeniy Dodis, Leonid Reyzin, and Adam Smith. Fuzzy extractors: How to generate strong keys from biometrics and other noisy data. in Christian Chachin and Jan Camenisch, editors, Eurocrypt 2004, vol. 3027 of LNCS, pp. 523-540. Springer, May 2004.
Yevgeniy Dodis and Adam Smith. Correcting errors without leaking partial information. In Harold N. Gabow and Ronald Fagin, editors, 37th ACM STOC, pp. 654(663. ACM Press, May 2005.
P. Paillier, "Public-Key Cryptosystems Based on Composite Degree Residuosity Classes," Advances in Cryptology—Eurocrypt '99 Lecture Notes in Computer Science vol. 1592, 1999, pp. 223-238, Apr. 15, 1999.
Yasuda, M., Shimoyama, T., Kogure, J., Yokoyama, K, Koshiba, T.: Practical packing method in somewhat homomorphic encryption. In: Data Privacy Management and Autonomous Spontaneous Security. Lecture Notes in computer Science, pp. 34-50. Springer, Mar. 2014.
C. Gentry, "Fully Homomorphic Encryption Using Ideal Lattices," Proceeding STOC '09 Proceedings of the forty-first annual ACM symposium on Theory of computing pp. 169-178, ACM New York, NY, USA 2009.
S. Dov Gordon, Jonathan Katz, Feng-Hao Liu, Elaine Shi, and Hong-Sheng Zhou. Multi-input functional encryption. Cryptology ePrint Archive, Report 2013/774, 2013. http://eprint.iacr.org/20131774.
Shafi Goldwasser, Vipul Goya!, Abhishek Jain, and Amit Sahai. Multi-input functional encryption. Cryptology ePrint Archive, Report 2013/727, 2013. http://eprintiacrorg/2013/727.
Ran Canetti. Towards realizing random oracles: Hash functions that hide all partial information. In Burton S. Kaliski Jr., editor, CRYPTO'97, vol. 1294 of LNCS, pp. 455{469. Springer, Aug. 1997.
Boaz Barak, Yevgeniy Dodis, Hugo Krawczyk, Olivier Pereira, Krzysztof Pietrzak, Francois-Xavier Standaert, and Yu Yu. Leftover hash lemma, revisited. In Phillip Rogaway, editor, CRYPTO 2011, vol. 6841 of LNCS, pp. 1{20. Springer, Aug. 2011.
Russell Impagliazzo, Leonid A. Levin, and Michael Luby. Pseudorandom generation from one-way functions axtended abstracts). In 21st ACM STOC, pp. 12{24. Acm Press, May 1989.

* cited by examiner

LEARNING PARITY WITH NOISE-BASED RELATIONAL ENCRYPTION FOR PROXIMITY RELATIONS

RELATED APPLICATIONS

This application is a continuation-in-part of U.S. patent application Ser. No. 14/797,025, filed Jul. 10, 2015, which is a continuation-in-part of U.S. patent application Ser. No. 14/287,051, filed May 25, 2014, which are incorporated herein by reference.

FIELD

The embodiments discussed herein are related to learning parity with noise (LPN)-based relational encryption.

BACKGROUND

A form of user authentication may include biometric authentication. Biometric authentication generally includes measuring a biometric characteristic of a user that is unique to the user. The measured biometric characteristic, or a representation thereof, is then used as a basis of authenticating an identity of the user. Biometric characteristics may include a user's fingerprints, irises, veins, a section of deoxyribonucleic acid (DNA), and the like. Biometric authentication may have an advantage of allowing the user to be authenticated without having to remember a password. Because the biometric characteristic may be unchangeable, privacy is important in biometric authentication systems. Moreover, biometric data may be highly non uniform.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes receiving a first linearity ciphertext. The first linearity ciphertext may represent a first biometric template that is encrypted using a relational linearity encryption scheme. The relational linearity encryption scheme may be based at least partially on learning parity with noise (LPN). The method may include receiving a second linearity ciphertext. The second linearity ciphertext may represent a second biometric template that is encrypted using the relational linearity encryption scheme. The method may include discovering a linearity relationship between the first linearity ciphertext and the second linearity ciphertext using a linearity relational secret key. The method may include receiving a first proximity hash value. The first proximity hash value may represent the first biometric template that is encrypted using a relational proximity hash scheme. The relational proximity hash scheme may be based on the relational linearity encryption scheme and an error correcting code (ECC). The method may include receiving a second proximity hash value. The second proximity hash value may represent the second biometric template that is encrypted using the relational proximity encryption scheme. The method may include detecting a proximity between the first proximity hash value and the second proximity hash value in terms of a Hamming distance. The method may include authenticating an identity of a user based on the proximity and the linearity relationship.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF SOME EXAMPLE EMBODIMENTS

A challenge of biometric authentication may be that a user may not change a biometric characteristic used as a basis for authentication. For example, the user may register a biometric template including biometric data describing one or more unique characteristics of the user such as a fingerprint of the user or an iris pattern of the user. If the biometric template is compromised, then the user may not be able to change the unique characteristics described by the biometric template. Thus, once compromised, another biometric template may be registered or a biometric template of another biometric characteristic may be registered. For at least this reason, biometric authentication systems may benefit from a strong privacy guarantee.

U.S. patent application Ser. No. 14/287,051 filed May 25, 2014, which is incorporated herein by reference in its entirety, describes a cryptographic primitive called relational encryption. The relational encryption is a semantically secure public key encryption scheme with just the knowledge of a public key.

In addition, in relational encryption, a semi-trusted entity may be provided a relational key. Using the relational key, the semi-trusted entity may discover one or more relationships among ciphertexts, but may not be able to decrypt and recover plaintext vectors from which the ciphertexts are generated. The relational encryption is developed in application Ser. No. 14/287,051 for discovering linear relations among bit-vectors and p-ary vectors. Using the relational encryption, a relational encryption scheme may be used to detect proximity between ciphertexts in terms of hamming distance. The relational encryption provides strong privacy guarantees for biometric templates in biometric authentication schemes, while enabling a semi-trusted server to perform authentication.

The relational encryption of application Ser. No. 14/287, 051 may be based on an assumption that the plaintext vectors are substantially uniformly random. In practice, and in particular biometric information, the assumption that the plaintext vectors are substantially uniformly random may not hold. The relational encryption scheme of application Ser. No. 14/287,051 may be based on a linear relational hash and an error correcting code.

U.S. patent application Ser. No. 14/797,025 filed Mar. 22, 2016, which is incorporated herein by reference in its entirety, describes an extension to the relational encryption so that it is provably secure over more diverse and more practical distributions of biometric information. For instance, the extension to the relational encryption may be based on an assumption that the plaintext vector includes high min-entropy. The extension to relational encryption scheme of application Ser. No. 14/797,025 may be based on a linear relational hash, an error correcting code, and an extractor.

Some embodiments described in this disclosure include another example relational encryption. The relational encryption scheme described herein is based on cryptographically hard learning parity with noise (LPN) problem. The relational encryption scheme described in this disclosure is secure over non-uniform biometric data with high unpredictability. The relational encryption scheme described herein may be more efficient than the relational encryption described in application Ser. No. 14/797,025 and application Ser. No. 14/287,051. The relational encryption scheme described herein may be based on a linear relational hash and an error correcting code and may be based on an assumption that the plaintext vector includes high min-entropy. Embodiments of the present invention will be explained with reference to the accompanying drawings.

Figure 1:
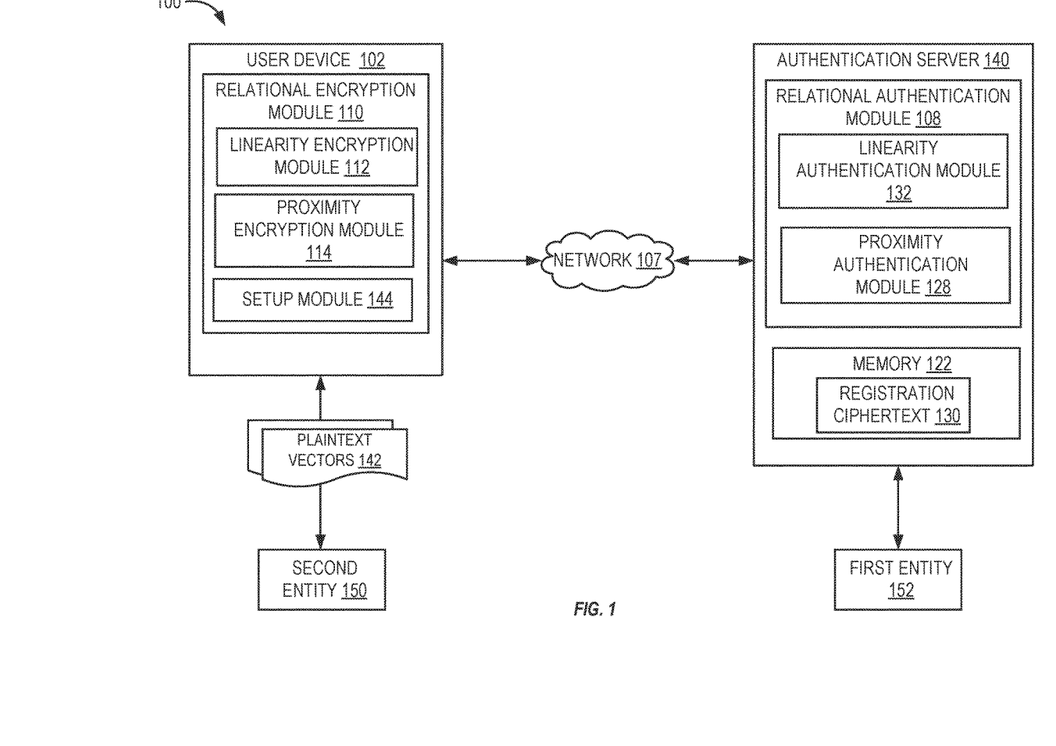
FIG. 1 is a block diagram of an example operating environment in which some embodiments may be implemented.

FIG. 1 illustrates a block diagram of an example operating environment 100, arranged in accordance with at least one embodiment described herein. In the operating environment 100, relational encryption may be performed. Relational encryption may include a cryptographic primitive which enables a first entity 152 to determine one or more relationships among two or more ciphertexts provided by a second entity 150. In particular, the relational encryption enables the first entity 152 to discover a linearity relationship between two or more of the ciphertexts and to detect a proximity between two or more of the ciphertexts. Additionally, the relational encryption may not allow the first entity 152 to recover the plaintexts from the ciphertexts or to construct a fraudulent ciphertext having a particular relationship with a particular, genuine ciphertext.

The relational encryption may be implemented in various environments. For example, the relational encryption may be implemented in a social environment in which individuals wish to keep their locations private, but a semi-trusted service may enable detection of proximity between the locations. Additionally, the relational encryption may be implemented in an image comparison environment. The proximity may be detected between images from a database to determine similarity between the images. Privacy of the images may be maintained. Users may search the images using relational encryption without being exposed to the images on the database. Additionally still, the relational encryption may be implemented in a private data storage environment. A user may encrypt its data and communicate the encrypted data to a database. Analytics (e.g., storage, clustering, etc.) may be performed on the encrypted data without a risk of the encrypted data being decrypted.

For example, a user device 102 associated with the second entity 150 may receive one or more plaintext vectors 142. The plaintext vectors 142 may include any set of data such as biometric templates, locational information, etc. The second entity 150 may communicate a first ciphertext or a hash value, which includes an encrypted version of one of the plaintext vectors 142, to an authentication server 140 of the first entity 152. Later, the user device 102 may receive another plaintext vectors 142. A second ciphertext, which includes an encrypted version of a second of the plaintext vectors 142, may be communicated to the authentication server 140 of first entity 152. The first entity 152 may discover whether there is a linearity relationship between the first ciphertext and the second ciphertext and may detect a proximity between the first ciphertext and the second ciphertext. The proximity may be in terms of Hamming distance in some embodiments.

However, the relational encryption may not allow the first entity 152 to construct the plaintext vectors 142 from the first and second ciphertexts. Moreover, the relational encryption may not allow the first entity 152 to construct a third ciphertext that includes a particular linearity relationship and/or a particular proximity with the first ciphertext and/or the second ciphertext. FIG. 1 depicts embodiments including two plaintext vectors 142 and, accordingly, two ciphertexts. In some embodiments more than two plaintext vectors 142 and, accordingly, more than two ciphertexts may be communicated to the authentication server 140 included in the operating environment 100.

The relational encryption may include one or more relational keys. The relational keys may be similar to public and/or signature keys and may be provided to or generated by the first entity 152. The relational keys may enable determination of the relationships between the ciphertexts, but may not allow decryption of the ciphertext or recovery of the plaintext vectors 142. Additionally, the relational keys may not allow construction of ciphertext having a particular relationship with a particular ciphertext.

In some embodiments, the relational encryption may be defined according to a relational hash scheme for a relation that includes a tuple of algorithms. The algorithms may include a key generation algorithm, a first encryption algorithm, a first decryption algorithm, a second encryption algorithm, a second decryption algorithm, and a verification algorithm. The relation may be defined as a subset of three sets. Additionally, the relation and the algorithms may satisfy one or more correctness conditions. For example, the relation may satisfy example correctness conditions:

$R \subseteq X \times Y \times Z$ $(pkx, skx, pky, sky, skR) \leftarrow KeyGen(1^\lambda)$ $cx \leftarrow EncX(pkx, x)$ $cy \leftarrow EncY(pky, y)$ $b \leftarrow Verify(skR, cx, cy, z)$ $b \approx R(x, y, z)$ In the correctness conditions, R represents the relation. The operator $\subseteq$ represents a subset operator. The parameters X, Y, and Z represent sets. The parameter x represents a first of the plaintext vectors 142. The parameter y represents a second of the plaintext vectors 142. KeyGen represents a key generation algorithm. EncX represents a first encryption algorithm. EncY represents a second encryption algorithm. Verify represents a verification algorithm. The operator $\leftarrow$ represents an output operator. The parameter pkx represents a first public key. The parameter pky represents a second public key. The parameter skx represents a first secret key. The parameter sky represents a second secret key. The parameter skR represents a relational secret key. The parameter cx represents a first ciphertext. The parameter cy represents a second ciphertext. The parameter b represents an output by the verification algorithm. The parameter $\lambda$ represents a security parameter. The parameter z represents a particular value that may be chosen by a verifier entity. The operator $\approx$ represents a congruency operator. In the correctness conditions, the output from the verification algorithm is congruent with the relation with an overwhelming probability.

The relational encryption scheme may be secure in the sense that the relational keys may not allow construction of a ciphertext having a particular relationship with a particular ciphertext and may not allow recovery of the plaintext vectors 142 from the particular ciphertext. For example, the relational encryption scheme may be secure if the following expressions hold:

1. Let $Kx(1^\lambda)$ be an algorithm that runs KeyGen $(1^\lambda)$, then takes the output (pkx, skx, pky, sky, skR) and outputs (pkx, skx). Then (Kx, EncX, DecX) is IND-CPA secure.
2. Let $Ky(1^\lambda)$ be an algorithm that runs KeyGen $(1^\lambda)$, then takes the output (pkx, skx, pky, sky, skR) and outputs (pky, sky). Then (Ky, EncY, DecY) is IND-CPA secure.
3. Let KR $(1^\lambda)$ be an algorithm that runs KeyGen $(1^\lambda)$, then takes the output (pkx, skx, pky, sky, skR) and outputs (pkx, skx, skR). Then EncX(pkx, •) and EncY (pky, •) are one-way functions given a knowledge of skR.

In the above expressions, pkx, skx, pky, sky, skR, KeyGen, EncX( ), $\lambda$, and EncY( ) are as described above. DecX represents a first decryption algorithm. DecY represents a second decryption algorithm. Kx( ), Ky( ), and KR( ) are as described in the expressions. The symbol • indicates any value. The term "IND-CPA" represents shorthand for indistinguishability under chosen-plaintext attack. In some other embodiments, (Ky, EncY, DecY) and/or (Kx, EncX, DecX) may be secure according to another computational security metric such as indistinguishability under chosen ciphertext attack (e.g., IND-CCA1 or IND-CCA2) or any other suitable security metric.

Additionally, in some embodiments, the relational encryption scheme may include a relational linearity encryption scheme. The relational linearity encryption scheme may define a relation according to an example linearity relationship expression:

$$R=\{(x,y,z)|x+y=z\wedge x,y,z\in F_p^n\}$$

In the linearity relationship expression, R, x, y, and z are as described above. The operator $\epsilon$ represents a membership operator. The operator | represents a 'such that' operator. The operator $\wedge$ represents a logical conjunction operator. The parameter F represents a field. The superscript n may generally represent a dimension of the field. The dimension of the field may include a length of one or more of the keys as discussed elsewhere herein. The subscript p represents a base-number of the field. For example, in $F_3^{10}$ the field includes a dimension of 10 and a base-number of three. The base-number of three indicates each element of the field is a zero, one, or two.

Additionally, in some embodiments, the relational encryption scheme may include a relational proximity encryption scheme that defines a relation according to an example proximity expression:

$$R_\delta=\{(x,y)|dist(x,y)\leq\delta\wedge x,y\in F_p^k\}.$$

In the proximity expression, R, x, $\Lambda$, $\epsilon$, and y are as described above. Parameter $\delta$ represents a distance that defines closeness. An operator dist represents a Hamming distance. As in the linearity relationship expression, the parameter F represents a field. However, the field in the proximity expression may include a different dimension than the field in the linearity relationship expression. The dimension of the field in the proximity expression may be related to a linear error correcting code.

The relational encryption schemes discussed herein may be implemented in the operating environment 100 of FIG. 1. The relational encryption scheme may enable the second entity 150 to communicate encrypted information to the first entity 152 and allow the first entity 152 to discover a linearity relationship among the encrypted information and/or determine a proximity between the encrypted information.

The operating environment 100 may include a user device 102 associated with the second entity 150 and the authentication server 140 that is associated with the first entity 152. The user device 102 and the authentication server 140 may be implemented in the operating environment 100 to perform the relational encryption. The user device 102 and the authentication server 140 may be configured to communicate via a network 107. For example, one or more ciphertexts, authentication messages, and other data and information related to the relational encryption may be communicated between the user device 102 and the authentication server 140 via the network 107. Each of the user device 102, the authentication server 140, and the network 107 are briefly described below.

The network 107 may be wired or wireless. The network 107 may include numerous configurations including a star configuration, token ring configuration, or other configurations. Furthermore, the network 107 may include a local area network (LAN), a wide area network (WAN) (e.g., the Internet), and/or other interconnected data paths across which multiple devices may communicate. In some instances, the network 107 may include a peer-to-peer network. The network 107 may also be coupled to or include portions of a telecommunications network for sending data in a variety of different communication protocols. In some instances, the network 107 includes BLUETOOTH® communication networks or a cellular communications network for sending and receiving data including via short messaging service (SMS), multimedia messaging service (MMS), hypertext transfer protocol (HTTP), Wi-Fi, direct data connection, wireless application protocol (WAP), e-mail, etc.

The user device 102 may include any computing device that includes a processor, memory, and communication capabilities that enable generation and communication of information and/or data (e.g., ciphertext, keys, plaintext vectors 142, etc.) related to relational encryption via the network 107. Some examples of the user device 102 may include a mobile phone, a scanning device, a smartphone, a tablet computer, a laptop computer, a desktop computer, a set-top box, or a connected device (e.g., a smartwatch, smart glasses, a smart pedometer, or any other connected device).

The user device 102 may include a relational encryption module 110. The relational encryption module 110 may be configured to receive the plaintext vectors 142 and perform one or more operations related to encryption of the plaintext vectors 142. For example, the relational encryption module 110 may be configured to generate one or more keys that are used in the encryption of the plaintext vectors 142. Additionally, the relational encryption module 110 may generate one or more ciphertexts based on the plaintext vectors 142.

The ciphertexts generated by the relational encryption module 110 may be communicated to the authentication server 140. Based on relationships (e.g., linearity and proximity) between the ciphertexts, an identity of the second entity 150 may be authenticated or not authenticated.

In particular, in the embodiment of FIG. 1, the relational encryption module 110 may include a setup module 144, a linearity encryption module 112, and a proximity encryption module 114.

The setup module 144 may be configured to perform one or more operations that generate one or more keys and/or one or more algorithms (e.g., encryption algorithms, decryption algorithms, and verification algorithms). The keys may be used in the relational encryption module 110 and/or a relational authentication module 108 of the authentication server 140. Some examples of the keys that may be generated by the setup module 144 may include linearity public keys, linearity secret keys, relational linearity keys, proximity public keys, proximity secret keys, and proximity relational secret keys. Some additional details of the keys are provided elsewhere in this disclosure.

The keys may be communicated via the network 107. For example, in the depicted embodiment, the setup module 144 may be included in the user device 102. The setup module 144 may generate the keys and may communicate some portion thereof to the authentication server 140. The authentication server 140 may authenticate or not authenticate an identity of the second entity 150 using the keys. For instance, authentication may be based on a proximity and a linearity relationship between ciphertexts of the plaintext vectors 142. In these and other embodiments, the authentication server 140 may discover a linearity relationship between the linearity ciphertexts of the plaintext vectors 142 using a linearity relational secret key. In addition, the authentication server 140 may detect a proximity between ciphertexts of the plaintext vectors 142 using a proximity relational secret key.

Another portion of the keys generated by the setup module 144 may be used by the linearity encryption module 112 and/or the proximity encryption module 114. For instance, the linearity encryption module 112 may generate linearity ciphertexts of the plaintext vectors 142 using the linearity public keys and the linearity secret keys. The linearity public keys and linearity secret keys may be based on an IND_CCA secure public key encryption scheme along with implementation of an LPN-based operation.

Additionally or alternatively, the proximity encryption module 114 may generate hash values of the plaintext vectors 142 based on one or more keys generated by the setup module 144. For example, the hash values of the plaintext vectors 142 may be generated based on a chosen-plaintext attack (CPA) public key, a CPA secret key, the linearity public keys, the linearity secret keys, or some combination thereof.

In some embodiments, the setup module 144 may be located remotely. For example, the setup module 144 may be located at a remote server (not shown). In these and other embodiments, the setup module 144 may generate keys that are communicated to the user device 102 and/or the authentication server 140.

The linearity encryption module 112 may be configured to perform one or more operations associated with encrypting the plaintext vectors 142 to construct linearity ciphertexts and/or associated with decrypting linearity ciphertexts. The linearity encryption module 112 may perform encryption and decryption operations according to a relational linearity encryption scheme. The relational linearity encryption scheme may be based on learning parity with noise (LPN) and/or a linear relational hash that implements features of the LPN.

The relational linearity encryption scheme implemented by the linearity encryption module 112 may generate one or more linearity ciphertexts. For instance, the linearity encryption module 112 may generate a first linearity ciphertext based on a first of the plaintext vectors 142 and a second linearity ciphertext based on a second of the plaintext vectors 142. The linearity ciphertexts may be communicated to the authentication server 140. From the linearity ciphertexts, the authentication server 140 may discover a linearity relationship between the plaintext vectors 142 using a linearity relational secret key.

The proximity encryption module 114 may be configured to perform one or more operations associated with encrypting the plaintext vectors 142 to construct proximity hash values. The proximity encryption module 114 may perform the operations based on a relational proximity hash scheme. The relational proximity hash scheme may be further based on the relational linearity encryption scheme and an error correction code (ECC).

For instance, the proximity encryption module 114 may generate a first proximity hash value based on a first of the plaintext vectors 142 and a second proximity hash value based on a second of the plaintext vectors 142. The proximity hash values may be communicated to the authentication server 140. The authentication server 140 may detect a proximity between the proximity hash values in terms of a Hamming distance using the proximity relational secret key.

The authentication server 140 may include a hardware server or another processor-based computing device configured to function as a server. The authentication server 140 may include the relational authentication module 108 and memory 122. The memory 122 may be substantially similar to memory 308 described below. Some additional details of the memory 122 are provided elsewhere herein.

The relational authentication module 108 may be configured to receive the linearity ciphertexts and/or the proximity hash values, the relational secret keys, the verification algorithms, or some combination thereof from the relational encryption module 110 or another source. The relational authentication module 108 may discover a linearity relationship between the ciphertexts and/or may detect a proximity between the proximity hash values. The relational authentication module 108 may use the relational secret keys and/or the verification algorithms to discover the linearity relationship and to detect the proximity between the ciphertexts.

The relational authentication module 108 may include a linearity authentication module 132 and a proximity authentication module 128. Although not shown in FIG. 1, in some embodiments, the setup module 144 or a module configured to perform one or more operations attributed to the setup module 144 may be included in the relational authentication module 108.

The linearity authentication module 132 may be configured to perform one or more operations associated with the linearity ciphertexts. For example, the linearity authentication module 132 may be configured to discover a linearity relationship between two or more of the linearity ciphertexts.

Discovery of the linearity relationship may be a function of a hamming distance. For instance, the linearity authentication module 132 may calculate a sum of an IND_CCA secure decryption algorithm (DecCPA) applied to a third secret key and a first element of a first linearity ciphertext, the DecCPA applied to the third secret key and a first element of the second linearity ciphertext, and a random binary matrix of a size of a first integer by a second integer. The linearity authentication module 132 may then calculate a product of the sum and the particular value that may be chosen by a verifier entity ('z' above). The linearity authentication module 132 may then determine whether a hamming distance of the product of the sum and the particular value is less than or equal to a product of a value of two, a probability, and the first integer.

The proximity authentication module 128 may be configured to perform one or more operations associated with the proximity hash values. For example, the proximity authentication module 128 may be configured to detect a proximity between two or more proximity hash values. In some embodiments, the proximity authentication module 128 may be performed according to proximity verification algorithms described elsewhere in this disclosure.

The relational encryption module 110, the linearity encryption module 112, the proximity encryption module 114, the setup module 144, the relational authentication module 108, the linearity authentication module 132, and the proximity authentication module 128 may be referred to collectively as the relational modules.

The relational modules may be implemented using hardware including a processor, a microprocessor (e.g., to perform or control performance of one or more operations), a field-programmable gate array (FPGA), or an application-specific integrated circuit (ASIC). In some other instances, the relational modules may be implemented using a combination of hardware and software. Implementation in software may include rapid activation and deactivation of one or more transistors or transistor elements such as may be included in hardware of a computing system (e.g., the user device 102 and the authentication server 140). Additionally, software defined instructions may operate on information within transistor elements. Implementation of software instructions may at least temporarily reconfigure electronic pathways and transform computing hardware.

In the next sections, learning parity with noise (LPN) is introduced. Following the introduction of the LPN, a linear relational hash scheme based on the LPN is described. Following the linear relational hash, a relational linearity encryption scheme that implements the linear relational hash is described. The relational linearity encryption scheme may be defined according to the linear relational hash scheme and a public key encryption scheme. Following the relational linearity encryption scheme, a relational proximity hash scheme is described. The relational proximity hash scheme is based on the relational linearity encryption scheme and an error correcting code (ECC).

Learning Parity with Noise (LPN)

A parity function in Boolean algebra may output a '1' if an input vector has an odd number of 1's. An example of the parity function is the 'XOR' function that receives two input vectors. Parity learning is a problem that appears primarily in machine learning. Algorithms have been developed that solves the parity learning problem. In the algorithms, a function is guessed based on some input samples and an assurance that the function computes the parity of bits at some locations. In parity learning, input samples include an input (e.g., an independent value) and a value of the function applied to the input (e.g., a dependent value calculated from the independent value). The input samples may be provided over a distribution of the function, which may reduce complexity of the algorithms.

LPN is a type of parity learning that may appear in cryptography and other applications. In LPN, the input samples may contain some error (e.g., noise). For instance, in LPN, the input samples may include the input (e.g., an independent value) and another value that is close to the function applied to the input (e.g., a dependent value calculated from the independent value) with some small probability.

In the embodiments described in this disclosure, the LPN may be defined according to the LPN expressions:

$s \leftarrow \mathbb{Z}_2^n; A \leftarrow \mathbb{Z}_2^{q \times n}; r \leftarrow \mathbb{Z}_2^n;$ and $e \leftarrow Ber_\tau^q$ then:

$(A, As+e) \approx (A, r)$.

In the LPN expressions, the parameter $\tau$ represents a probability. The function $Ber_\tau^q$ is a function that outputs a q-bit number in which each entry is a '1' with a probability $\tau$ (also referred to as noise probability in this disclosure) or a '0' otherwise. The parameter $\mathbb{Z}_2^n$ represents the integer number set. The subscript '2' next to the field represents the base-number of the integer number set. The superscript 'n' next to the field represents the dimension of the integer number set. In $\mathbb{Z}_2^{q \times n}$ the integer number set includes a dimension of q×n. The parameters s, A, and r are sampled from the integer number set and are related according to the LPN expressions.

A benefit of LPN includes efficiency. In particular, the LPN expressions may be implemented in terms of XOR gates and AND gates. In addition, the LPT is secure even if s is sampled from a high min-entropy distribution such as biometric samples. In some embodiments, the probability $\tau$ may be about 1/4.

Linear Relational Hash Scheme

The LPN expressions may be implemented in the operating environment 100 to generate hash values of the plaintext vectors 142. The linear relational hash may include multiple functions that may be applied to the plaintext vectors 142. The functions may include a Hash_KEYGEN function, a $Hash_1(x)$ function, a $Hash_2(y)$ function, and a Hash_Verify function. The Hash_KEYGEN function may be configured to generate a hash key. The $Hash_1(x)$ function and the $Hash_2(y)$ function may be configured to hash one or more input vectors (e.g., the plaintext vectors 142). The Hash_Verify function may be configured to verify a relationship between the input vectors.

The linear relational hash may be applied in the operating environment 100 according to linear relational hash expressions:

Hash_KEYGEN:

$A \leftarrow \mathbb{Z}_2^{q \times n};$ $Hash_1(x): e_1 \leftarrow Ber_\tau^q:$ Output: $hx_1 = Ax + e_1;$ $Hash_2(y): e_2 \leftarrow Ber_\tau^q:$ Output: $hy_2 = hy + e_2;$ and $Hash\_Verify(hx_1, hy_2, z):$ Output: 1 if $(hx_1 + hy_2 - Az)$ is small, to verify $x+y \stackrel{?}{=} z.$ In the linear relational hash expressions, A, $Ber_\tau^q$, $\mathbb{Z}_2^{q \times n}$, $\mathbb{Z}_2^n$ are as described above. The operator $\leftarrow$ represents a random sampling operator. The parameter x in the linear relational hash expressions represents a first of the plaintext vectors 142. The parameter y in the linear relational hash expressions represents a second of the plaintext vectors 142. The parameters $e_1$ and $e_2$ are examples of the output of the $Ber_\tau^q$ function. The parameter $hx_1$ represents a hash value output by the $Hash_1(x)$ function based on the first of the plaintext vectors 142. The parameter $hy_2$ represents a hash value output by the $Hash_2(y)$ function and based on the second of the plaintext vectors 142. The parameter z represents a particular value indicative of sufficiency of a relationship between the hash values outputs.

The security in the linear relational hash expressions may be based on the LPN described above. In addition, the linear relational hash expressions may be symmetric and may be substantially one-way, which furthers the security.

For example, the one-way-ness of the linear relational hash expressions may be defined according to one-way-ness expressions:

If:
$x \in \mathbb{Z}_2^n$ is drawn from a high min-entropy distribution, $e_1 \leftarrow Ber_\tau^q$;
then:
Given: $A \leftarrow \mathbb{Z}_2^{q \times n}$ and $Hash_1(x): hx_1 = Ax + e_1$,
it is computationally infeasible for any polynomial time (i.e. feasible running time) algorithm to output x or any x' that is close to x.

In the one-way-ness expression, $e_1$, $\leftarrow$, $Ber_\tau^q$, x, $Hash_1(x)$, A, $\mathbb{Z}_2^{q \times n}$, and $hx_1$ are as described immediately above. The high min-entropy distribution includes distributions such as biometric templates.

Relational Linearity Encryption Scheme

The linearity keys may be generated for a security parameter. Generally, the security parameter as used herein may refer to a key length. In some embodiments, generation of the linearity keys may be performed according to linearity bit vector key expressions. An example of linearity bit vector key expressions include:

Given $\lambda$:
generate integers m, n, and real $\tau \in [0, 1]$;
generate a random binary matrix A of size m×n;
fix any IND_CCA secure public key encryption scheme that includes a key generation algorithm (Keygen-CPA), an encryption algorithm (EncCPA) and a decryption algorithm (DecCPA);
run the Keygen-CPA three times to generate three sets of public/secret key pairs:
(pk_1, sk_1), (pk_2, sk_2) and (pk_3, sk_3); and
set:
pkxlin:=(A, $\tau$, pk_1, pk_3);
skxlin:=sk_1;
pkylin:=(A, $\tau$, pk_2, pk_3);
skylin:=sk_2; and
skRlin:=(A, $\tau$, sk_3).

In the linearity bit vector key expressions, $\leftarrow$, and $\lambda$ are generally as described above. In addition, in the linearity bit vector key expressions, pkxlin represents a first linearity public key, skxlin represents a first linearity secret key, pkylin represents a second linearity public key, skylin represents a second linearity secret key, and skRlin represents a relational linearity secret key. The parameter $\tau$ represents a noise probability. Additionally, the parameters pkxlin, skxlin, pkylin, skylin, and skRlin may represent at least a linearity portion of the output of the key generation algorithm (KeyGen) discussed above. In some embodiments $\tau$ may be equal to ¼.

The linearity encryption module 112 may encrypt the plaintext vectors 142. The linearity encryption module 112 may receive the plaintext vectors 142. In some embodiments, the linearity encryption module 112 may encrypt the plaintext vectors 142 according to example linearity bit vector encryption expressions:

$m1 = \langle m1_i \rangle_{i=1}^n \in F_2^n$;

$m2 = \langle m2_i \rangle_{i=1}^n \in F_2^n$;

$cx := EncCPA(pk\_3, A \times m1 + e1), EncCPA(pk\_1, m1)$;

$cy := EncCPA(pk\_3, A \times m2 + e2), EncCPA(pk\_2, m2)$;

$e1 \in F_2^m$ w/each element=1 with probability $\tau$, else 0; and $e2 \in F_2^m$ w/each element=1 with probability $\tau$, else 0.

In the linearity bit vector encryption expressions, EncCPA represents an encryption algorithm of the IND_CCA secure public key encryption scheme discussed above. The + operator represents a bit-wise XOR operator. The parameter cx represents a first linearity ciphertext and the parameter cy represents a second linearity ciphertext. The parameter m1 represents the first message of n bits such as the plaintext vectors 142. The parameter $m1_i$ represents an element of the first of the plaintext vectors 142. The parameter m2 represents a second of the plaintext vectors 142. The parameter $m2_i$ represents an element of the second of the plaintext vectors 142. The parameter F represents a field. The subscript '2' next to the first field represents the base-number of the field. The superscript 'n' next to the first field represents the dimension of the vector containing first field elements. The parameter i represents an indexing variable. In the linearity bit vector key expressions, the indexing variable includes the range from one to the dimension of the first field. The operator $\langle \rangle$ represents a shorthand notation. For example, $\langle b_i \rangle_{i=1}^n$ represents $b_1, b_2, \ldots b_n$.

The linearity bit vector encryption expressions may define the first encryption algorithm (EncX) and the second encryption algorithm (EncY) discussed above. For example, the first encryption algorithm may be defined as:
given: m1 and pkxlin,
sample the random binary matrix A, and
construct cx as:

$cx := EncCPA(pk\_3, A \times m1 + e1), EncCPA(pk\_1, m1)$.

Likewise, the second encryption algorithm may be defined as:
given m2 and pkylin,
sample the random binary matrix A, and
construct cy as:

$cy := EncCPA(pk\_3, A \times m2 + e2), EncCPA(pk\_2, m2)$.

The first linearity ciphertext and the second linearity ciphertext may be communicated to the linearity authentication module 132. Additionally or alternatively, the first linearity ciphertext and the second linearity ciphertext may be communicated to the authentication server 140 via the network 107. The authentication server 140 may receive the first linearity ciphertext and the second linearity ciphertext and communicate the first linearity ciphertext and the second linearity ciphertext to the linearity authentication module 132.

In some embodiments, the first linearity ciphertext may be communicated to the linearity authentication module 132 prior to communication of the second linearity ciphertext. The linearity authentication module 132 may store the first linearity ciphertext in the memory 122 as the registration ciphertext 130. After communicating the first linearity ciphertext, the second linearity ciphertext may be communicated to the linearity authentication module 132. Additionally, the setup module 144 may communicate the relational linearity secret key to the linearity authentication module 132.

In some embodiments in which relational encryption are used for authentication the first linearity ciphertext may be stored as the registration ciphertext 130. The registration ciphertext 130 may be used as a basis of comparison against the second linearity ciphertext or any other subsequent linearity ciphertext. In other embodiments, implementing relational encryption, the first linearity ciphertext may not be stored as the registration ciphertext 130. For example, the first linearity ciphertext and the second linearity ciphertext may be analyzed without storing them or may they may both be stored.

The linearity authentication module 132 may be configured to discover a linearity relationship between the first linearity ciphertext and the second linearity ciphertext. In some embodiments, the linearity authentication module 132 discovers the linearity relationship between the first linearity ciphertext and the second linearity ciphertext according to example linearity bit vector verification expressions:

$z = \langle z_i \rangle_{i=1}^n \in F_2^n;$ $cx\_0 := EncCPA(pk\_3, A \times m1 + e1);$ $cy\_0 := EncCPA(pk\_3, A \times m2 + e2);$ and $dist(DecCPA(sk\_3, cx\_0) + DecCPA(sk\_3, cy\_0) +$
$A \times z) \stackrel{?}{<} 2 \times \tau \times m).$ In the linearity bit vector verification expressions, $\langle \ \rangle$, n, A, $F_2^n$, pk_3, m1, e1, $\tau$, m2, e2, sk_3 are as described above. In the linearity bit vector verification expressions dist is a function which evaluates hamming weight of an m-bit vector. The parameter cx_0 represents a first component of the first linearity ciphertext. The parameter cy_0 represents a first component of the second linearity ciphertext. The parameter z represents the particular vector. The parameter $z_i$ represents an element of the particular vector. The operator + represents a bitwise XOR operator.

The linearity bit vector verification expressions may define the verification algorithm (Verify) discussed above. In particular, the verification algorithm may be defined as:
given cy, cx, z, and skRlin:=(A, $\tau$, sk_3):
check the inequality:

$dist(DecCPA(sk\_3, cx\_0) + DecCPA(sk\_3, cy\_0) +$
$A \times z) \stackrel{?}{<} 2 \times \tau \times m).$ The linearity bit vector decryption expressions may define the first decryption algorithm (DecX) and the second decryption algorithm (DecY) discussed below. For example, the first decryption algorithm may be defined as:
given: cx and skxlin,
construct the first plaintext vector 142 bit by bit according to an expression:

$cx\_1 = EncCPA(pk\_1, m1);$ and $m1 = DecCPA(skxlin, cx\_1).$

In the first decryption algorithm, skxlin, EncCPA, pk_1, m1, skxlin, and DecCPA are as described above. The parameter cx_1 is the second component of the first linearity ciphertext (e.g., cx).

Likewise, the second decryption algorithm may be defined as:
given: cy and skylin,
construct the second plaintext vector 142B bit by bit according to an expression:

$cy\_1 = EncCPA(pk\_2, m2)$ $m2 = DecCPA(skylin, cy\_1)$

In the second decryption algorithm, skylin, EncCPA, pk_2, m2, and DecCPA are as described above. The parameter cy_1 is a second component of the second linearity ciphertext (e.g., cy).

Relational Proximity Hash Scheme

For the relational proximity hash scheme implemented in embodiments described in this disclosure, decryption of cypertexts may not be possible. Accordingly, the relational proximity hash scheme may be a relational proximity hash scheme instead of a relational proximity encryption scheme. The relational proximity hash scheme may be used to determine a closeness between proximity hash values. In some embodiments, the proximity may be provided in terms of a Hamming distance. In the relational proximity hash scheme, the setup module 144 generates keys. Using the keys the proximity encryption module 114 performs an encryption and/or a decryption of the plaintext vectors 142. Proximity hash values may then be communicated to the proximity authentication module 128 where a proximity between the proximity hash values may be detected.

For example, the setup module 144 may generate an output of a chosen-plaintext attack (CPA) key generation algorithm and a linearity key generation algorithm. For example, the setup module 144 may run the linearity keys as described elsewhere herein. The CPA key generation algorithm may output a CPA public key and a CPA secret key. The linearity key generation algorithm may output the pkxlin, skxlin, pkylin, skylin, and skRlin as discussed above.

Additionally, the setup module 144 may choose an error correcting code (ECC). The ECC may be a linear error correcting code scheme. The ECC may include a length, a rank, and a distance. Additionally, the ECC may also include an ECC encoding operator (ENCODE) and an ECC decoding operator (DECODE). The setup module 144 may then generate a first proximity secret key, a second proximity secret key, a first proximity public key, a second proximity public key, and a proximity relational secret key (collectively, "proximity keys"). The proximity keys are used to hash the plaintext vectors 142 to generate proximity hash values and to detect a proximity between the proximity hash values.

The first proximity secret key may be defined based on the CPA secret key and the first linearity secret key. The second proximity secret key may be defined based on the CPA secret key and the second linearity secret key. The first proximity public key may be defined based on the ENCODE, the DECODE, the CPA public key, the first linearity public key, and a random matrix. The second proximity public key may be defined based on the ENCODE, the DECODE, the CPA public key, the second linearity public key, and the random matrix. The proximity relational secret key may be defined based on the CPA secret key and the linearity relational secret key.

In some embodiments, the setup module 144 may generate the proximity keys according to example proximity key generation expressions:

$(pkCPA, skCPA) \leftarrow KeyGen\text{-}CPA;$ $(pkxlin, pkylin, skxlin, skylin, skRlin) \leftarrow KeyGenLinear;$ $X \leftarrow Z_2^{n \times k};$ $pkxprox := (ENCODE, DECODE, pkCPA, pkxlin, X);$ $pkyprox := (ENCODE, DECODE, pkCPA, pkylin, X);$ $skxprox := (skCPA, skxlin);$ $skyprox := (skCPA, skylin);$ and $skRprox := (skCPA, skRlin).$ In the proximity key generation expressions, pkxlin, pkylin, skxlin, skylin, skRlin, ENCODE, and DECODE are as described above. The operator $\leftarrow$ represents a random sampling operator. The parameter pkCPA represents a CPA public key. The parameter skCPA represents a CPA secret key. The parameter KeyGen-CPA represents a CPA key generation algorithm. The parameter k represents the rank. The parameter pkxprox represents a first proximity public key. The parameter pkyprox represents a second proximity public key. The parameter X represent the random matrix. The parameter skxprox represents a first proximity secret key. The parameter skyprox represents a second proximity secret key. The parameter skRprox represents a proximity relational secret key. Additionally, the parameters pkxprox, skxprox, pkyprox, skyprox, and skRprox may represent at least a proximity portion of the output of the key generation algorithm (KeyGen) discussed above.

The first proximity public key may be used by the proximity encryption module 114 to hash the first plaintext vector 142A to generate a first proximity hash value. The proximity encryption module 114 may receive the plaintext vectors 142 and communicate the plaintext vectors 142 to the proximity encryption module 114. The plaintext vectors 142 may include a member of the first or second fields described above.

The proximity encryption module 114 may sample the proximity random number (r below) from a third field. The third field may include a base-number and a dimension that may be the rank of the ECC. The proximity encryption module 114 may then construct the first proximity hash value and the second proximity hash value. Each of the first proximity hash value and the second proximity hash value may include two parts. The first part of the first proximity hash value may include a CPA encryption algorithm receiving as inputs the CPA public key and a sum of the first plaintext vector 142A and ENCODE receiving the proximity random number as an input. The second part of the first proximity hash value may include the first linearity encryption algorithm that receives the first linearity public key and the proximity random number.

The first part of the second proximity hash value may include a CPA encryption algorithm receiving as inputs the CPA public key and a sum of the second plaintext vector 142B and ENCODE receiving the proximity random number as an input. The second part of the second proximity hash value may include the second linearity encryption algorithm that receives as inputs the second linearity public key and the proximity random number.

In some embodiments, the proximity hash values may be generated according to example proximity encryption expressions:

$cxp1:=EncCPA(pkCPA,m1+ENCODE(r))$;

$cxp2:=EncXLinear(pk)din, X \circ r)$;

$cxp:=(cxp1,cxp2)$;

$cyp1:=EncCPA(pkCPA,m2+ENCODE(r))$;

$cyp2:=EncYLinear(pkylin, X \circ r)$; and $cyp:(cyp1,cyp2)$.

In the proximity encryption expression, ENCODE, m1, m2, pkCPA, X, pkxlin, and pkylin are as described above. The EncCPA represents the CPA encryption algorithm. The parameter r represents a proximity random number of k bits. The parameter cxp1 represents a first part of a first proximity hash value. The parameter cxp2 represents a second part of the first proximity hash value. The parameter cxp represents the first proximity hash value. The parameter cyp1 represents a first part of a second proximity hash value. The parameter cyp2 represents a second part of the second proximity hash value. The parameter cyp represents the second proximity hash value. The parameter EncXLinear represents a first linearity encryption algorithm. The parameter EncYLinear represents a second linearity encryption algorithm.

The first proximity hash value may be communicated to the authentication server 140, where it may be stored as the registration ciphertext 130. The second proximity public key may be used by the proximity encryption module 114 to hash the second plaintext vector 142B to generate a second proximity hash value. The second proximity hash value may be communicated to the authentication server 140. The proximity relational secret key may be used at the authentication server 140. In particular, the proximity relational secret key may be used by the proximity authentication module 128 to detect the proximity between the second proximity hash value and the first proximity hash value, which is stored as the registration ciphertext 130.

The proximity authentication module 128 may be configured to detect proximity between the first proximity hash value and the second proximity hash value. To detect the proximity, the proximity authentication module 128 may access the DECODE, which may be available in public key information. The proximity authentication module 128 may also recover a randomness sum for the first proximity hash value. The randomness sum for the first proximity hash value may be defined as the DECODE that receives as input a CPA decryption algorithm (DecCPA) that further receives as inputs the CPA secret key and a sum of the first part of the first proximity hash value and the CPA decryption algorithm that receives as inputs the CPA secret key and the first part of the second proximity hash value.

If the DECODE returns an error then the proximity authentication module 128 may return a rejection. Additionally, the proximity authentication module 128 may output the linearity verification algorithm that receives as inputs the linearity relational secret key, the first part of the second proximity hash value, the second part of the second proximity hash value, and the randomness sum.

Thus, the proximity verification algorithm may be defined to receive the first proximity hash value, the second proximity hash value, and the proximity secret key. The proximity verification algorithm may recover the randomness sum and output either a rejection or the linearity verification algorithm that receives as inputs the linearity relational secret key, the first part of the second proximity hash value, the second part of the second proximity hash value, and the randomness sum. For example, the proximity authentication module 128 may perform one or more operations according to example proximity verification algorithms:

$Z_{rs}:=\text{DECODE}(DecCPA(skcpa,cx\_1+DecCPA(skcpa, cy\_1))$; and $$\text{Output} = \begin{cases} \text{reject, if DECODE returns } \perp \\ \text{Verify Linear}(skRlin, cx\_2, cy\_2, X \circ z) \end{cases}.$$

In the proximity verification algorithm, skcpa, cx_1, cx_2, cy_1, cy_2, skRlin, X, z, DecCPA, and DECODE are as described above. The parameter Output indicates an output of the proximity authentication module 128. The parameter $Z_{rs}$ represents the randomness sum. The parameter) represents an error. The VerifyLinear represents the linearity verification algorithm.

The relational proximity encryption scheme described herein may be secure if the following conditions are true:

ECC is a (n', k, 2δ) linear error correction scheme;

(KeyGenCPA, EncCPA, DecCPA) is a IND-CPA secure encryption scheme;

(KeyGenLinear, EncXLinear, DecXLinear, EncYLinear, EncYLinear, VerifyLinear); and is a relational encryption scheme for linearity in $F_2^n$.

In the conditions, KeyGenCPA, EncCPA, DecCPA, KeyGenLinear, EncXLinear, DecXLinear, EncYLinear, DecYLinear, VerifyLinear, and F are as described above. ECC represents the ECC. The parameter n' represents the length of the codewords. The parameter k represents the length of the messages. The parameter 2δ represents the minimum distance.

Modifications, additions, or omissions may be made to the operating environment 100 without departing from the scope of the present disclosure. The present disclosure may apply to operating environments that include one or more user devices 102, one or more authentication servers 140, one or more second entities 150, one or more first entities 152, or any combination thereof Moreover, the separation of various components in the embodiments described herein is not meant to indicate that the separation occurs in all embodiments. It may be understood with the benefit of this disclosure that the described components may be integrated together in a single component or separated into multiple components.

Figure 2:
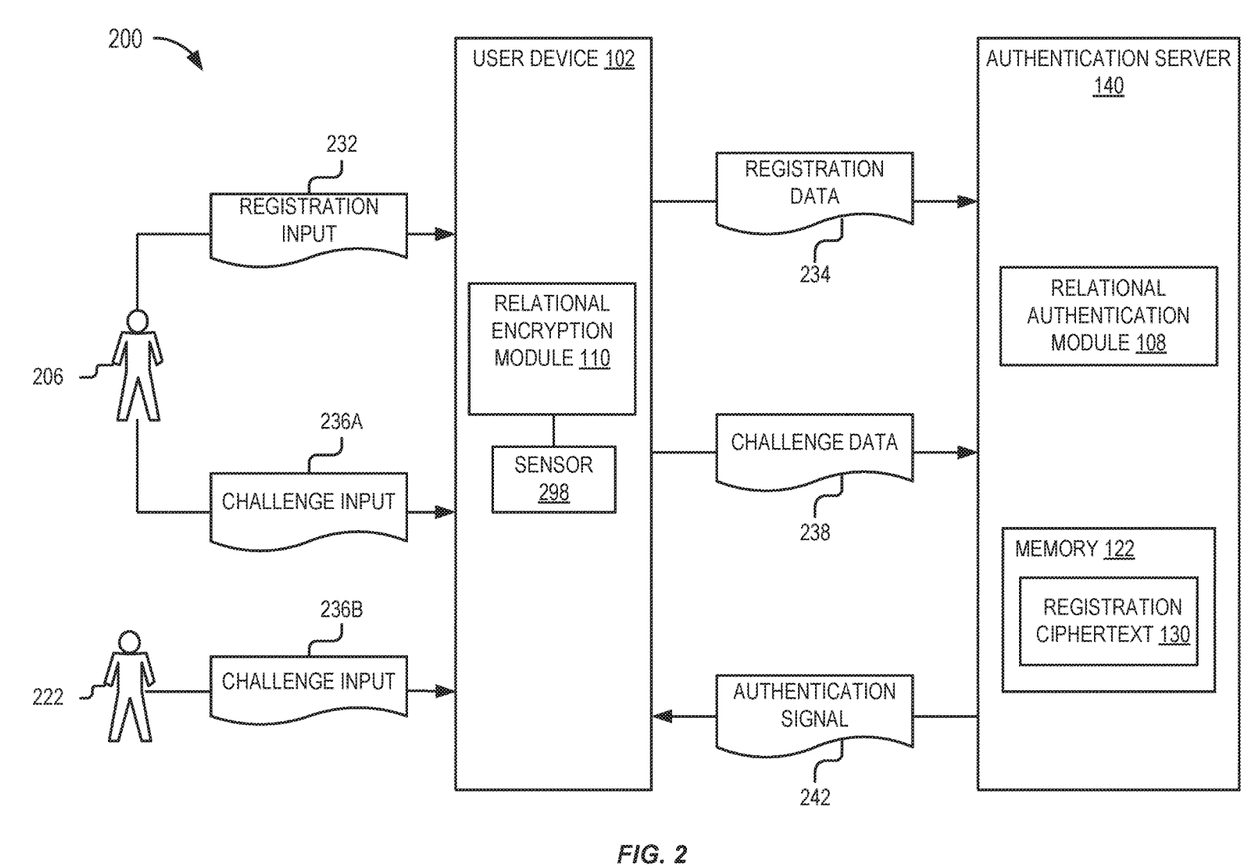
FIG. 2 is a block diagram of an example biometric authentication environment.

FIG. 2 illustrates a block diagram of a biometric authentication system (biometric system) 200, arranged in accordance with at least one embodiment described herein. The biometric system 200 may be included in or include an example of the operating environment 100 of FIG. 1 in which an authentication service is provided. In the biometric system 200 authentication of a user 206 may be performed by the authentication server 140. In the biometric system 200, the relational encryption discussed with reference to FIG. 1 may be used to authenticate the identity of the user 206.

The authentication service may include a registration process and an authentication process. The registration process may include obtaining information and data from the user 206 that may be used in the authentication process. The authentication process may occur later in time (e.g., subsequent to the registration process). In the authentication process, the identity of the user 206 may be authenticated using one or more of the relational encryption operations discussed with reference to FIG. 1. Generally, the identity of the user 206 may be authenticated by discovering linearity between a first linearity ciphertext and a second linearity ciphertext and detecting the proximity between a first proximity hash value and a second proximity hash value as described herein. The first linearity ciphertext and the first proximity hash value may be provided by the user 206 in the form of a first biometric template. The first biometric template may be included in the first of the plaintext vectors 142 of FIG. 1 and/or the registration input 232 of FIG. 2.

The user 206 and/or an imposter 222 (discussed below) may include an individual that has one or more biometric characteristics. The biometric characteristics may include one or more unique features. For example, the biometric characteristics may include a fingerprint of the user 206 that includes patterns of ridges and/or furrows. The user 206 may be associated with the user device 102 in some embodiments. For example, the user 206 may own or regularly operate the user device 102. In some embodiments, the user 206 may not be specifically associated with the user device 102. For example, the user device 102 may be publicly accessible to multiple users including the user 206. In some embodiments, the imposter 222 may include an entity that supplies input that may represent biometric characteristics.

In some embodiments, the user device 102 may include a sensor 298. The sensor 298 may include a hardware device, for instance, that is configured to measure or otherwise capture a biometric characteristic used to authenticate the user 206. When the biometric characteristic of the user 206 is measured or otherwise captured, the user device 102 may generate the biometric template. The biometric template may be representative of the biometric characteristic and may include at least some of the unique features of the biometric characteristic of the user 206. The biometric template may include a graphical representation and/or algorithmic representation of the biometric characteristic, for example.

Some examples of the sensor 298 may include: a fingerprint scanner; a camera configured to capture an image of an iris; a device configured to measure DNA; a heart rate monitor configured to capture heart rate; a wearable electromyography sensor configured to capture electrical activity produced by skeletal muscles; or any other sensor 298 configured to measure or otherwise capture a biometric characteristic.

In the illustrated biometric system 200, the sensor 298 is included in the user device 102. In other embodiments, the sensor 298 may be communicatively coupled to the user device 102 or a processor included therein. For example, the sensor 298 may be configured to communicate a signal to the user device 102 via a network such as the network 107 of FIG. 1. Although only one sensor 298 is depicted in FIG. 2, in some embodiments the user device 102 may include one or more sensors 298.

The relational encryption module 110 may generate the first linearity ciphertext and the first proximity hash value from the registration input 232. The relational encryption module 110 may then communicate the first linearity ciphertext and the first proximity hash value as registration data 234 to the authentication server 140.

The relational authentication module 108 may store the first linearity ciphertext and the first proximity hash value as the registration ciphertext 130. The registration ciphertext 130 may be associated with the user 206. For example, the user 206 may have associated therewith a user identifier. The registration ciphertext 130 may be stored in the memory 122 in some embodiments.

The relational encryption module 110 may then receive a first challenge input 236A or a second challenge input 236B (generally, challenge input 236). The first challenge input 236A and the second challenge input 236B may be an attempt by the user 206 or the imposter 222 to have their identity authenticated. The first challenge input 236A and/or the second challenge input 236B may include a second biometric template read by the sensor 298, for instance. The second biometric template may be representative of the unique features of the biometric characteristic of the user 206 or the imposter 222.

The relational encryption module 110 may generate the second linearity ciphertext and the second proximity hash value from the challenge input 236. The relational encryption module 110 may then communicate the second linearity ciphertext and the second proximity hash value as challenge data 238 to the authentication server 140.

The relational authentication module 108 may receive the challenge data 238. The relational authentication module 108 may then retrieve the registration ciphertext 130 for the user 206.

The relational authentication module 108 may determine a linearity relationship between the first linearity ciphertext stored as the registration ciphertext 130 and the second linearity ciphertext received from the user device 102. Additionally, the relational authentication module 108 may determine a proximity relationship between the first proximity hash value stored as the registration ciphertext 130 and the second proximity hash value received from the user device 102.

In response to the first linearity ciphertext having a linearity relationship with the second linearity ciphertext and there being a particular proximity between the first proximity hash value and the second proximity hash value, the authentication server 140 may determine that an approximate similarity exists between the first biometric template and the second biometric template.

Thus, if the first challenge input 236A that is provided by the user 206 is the basis of the second linearity ciphertext and the second proximity hash value, then there may be a linearity relationship between the first linearity ciphertext and the second linearity ciphertext and there may be a proximity between the first proximity hash value and the second proximity hash value.

However, if the second challenge input 236B that is provided by the imposter 222 is the basis of the second linearity ciphertext and second proximity hash value, then there may not be a linearity relationship between the first linearity ciphertext and the second linearity ciphertext and there may not be a proximity between the first proximity hash value and the second proximity hash value.

Based on the linear relation and/or the proximity, the relational authentication module 108 may make an authentication decision. For example, the relational authentication module 108 may determine whether the challenge data 238 originates at the user 206 or the imposter 222. The relational authentication module 108 may communicate an authentication signal 242 based on discovery of the linearity relationship and/or detection of the proximity. The relational encryption module 110 may receive the authentication signal 242.

Modifications, additions, or omissions may be made to the biometric system 200 without departing from the scope of the present disclosure. Specifically, embodiments depicted in FIG. 2 include one user 206, one user device 102, and one authentication server 140. However, the present disclosure applies to the biometric system 200 that may include one or more users 206, one or more user devices 102, one or more authentication servers 140, or any combination thereof Moreover, the separation of various components in the embodiments described herein is not meant to indicate that the separation occurs in all embodiments. It may be understood with the benefit of this disclosure that the described components may be integrated together in a single component or separated into multiple components. For example, in some embodiments, the relational encryption module 110 and/or one or more functionalities attributed thereto may be performed by a module on the authentication server 140.

Figure 3:
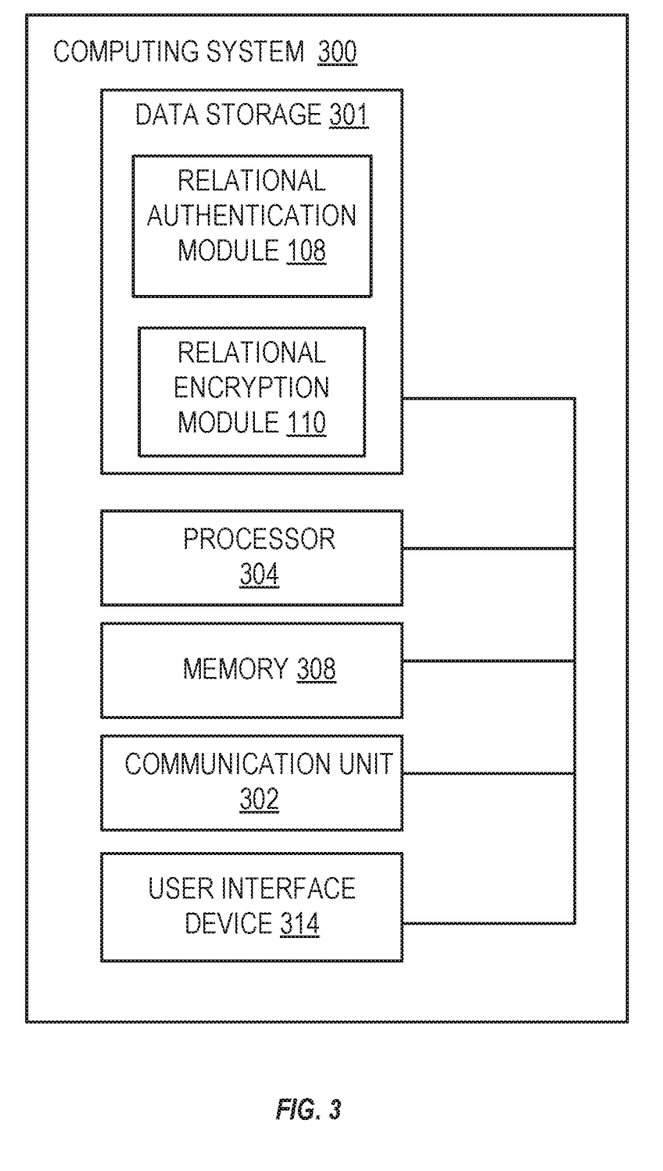
FIG. 3 is a block diagram of a computing system configured for relational encryption.

FIG. 3 illustrates an example computing system 300 configured for relational encryption. The computing system 300 may be implemented in the operating environment 100 of FIG. 1, for instance. Examples of the computing system 300 may include the user device 102 or an authentication server 140. The computing system 300 may include one or more processors 304, a memory 308, a communication unit 302, the user interface device 314, and a data storage 301 that includes the relational authentication module 108 and the relational encryption module 110 (collectively, modules 108/110).

The processor 304 may include any suitable special-purpose or general-purpose computer, computing entity, or processing device including various computer hardware or software modules and may be configured to execute instructions stored on any applicable computer-readable storage media. For example, the processor 304 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 3, the processor 304 may more generally include any number of processors configured to perform individually or collectively any number of operations described in the present disclosure. Additionally, one or more of the processors 304 may be present on one or more different electronic devices or computing systems. In some embodiments, the processor 304 may interpret and/or execute program instructions and/or process data stored in the memory 308, the data storage 301, or the memory 308 and the data storage 301. In some embodiments, the processor 304 may fetch program instructions from the data storage 301 and load the program instructions in the memory 308. After the program instructions are loaded into the memory 308, the processor 304 may execute the program instructions.

The memory 308 and the data storage 301 may include computer-readable storage media for carrying or having computer-executable instructions or data structures stored thereon. The term computer readable media may refer to a single medium or multiple media. Such computer-readable storage media may include any available media that may be accessed by a general-purpose or special-purpose computer, such as the processor 304. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 304 to perform a certain operation or group of operations.

Computer-executable instructions comprise, for example, instructions and data, which cause a general-purpose computer, special-purpose computer, or special-purpose processing resource to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The communication unit 302 may include one or more pieces of hardware configured to receive and send communications. In some embodiments, the communication unit 302 may include one or more of an antenna, a wired port, and modulation/demodulation hardware, among other communication hardware devices. In particular, the communication unit 302 may be configured to receive a communication from outside the computing system 300 and to present the communication to the processor 304 or to send a communication from the processor 304 to another device or network (e.g., 107 of FIG. 1).

The user interface device 314 may include one or more pieces of hardware configured to receive input from and/or provide output to a user. In some embodiments, the user interface device 314 may include one or more of a speaker, a microphone, a display, a keyboard, a touch screen, or a holographic projection, among other hardware devices.

The modules 108/110 may include program instructions stored in the data storage 301. The processor 304 may be configured to load the modules 108/110 into the memory 308 and execute the modules 108/110. Alternatively, the processor 304 may execute the modules 108/110 line-by-line from the data storage 301 without loading them into the memory 308. When executing the modules 108/110, the processor 304 may be configured to perform relational authentication as described elsewhere in this disclosure.

Modifications, additions, or omissions may be made to the computing system 300 without departing from the scope of the present disclosure. For example, in some embodiments, the computing system 300 may not include the user interface device 314. In some embodiments, the different components of the computing system 300 may be physically separate and may be communicatively coupled via any suitable mechanism. For example, the data storage 301 may be part of a storage device that is separate from a server, which includes the processor 304, the memory 308, and the communication unit 302, that is communicatively coupled to the storage device.

Figure 4:
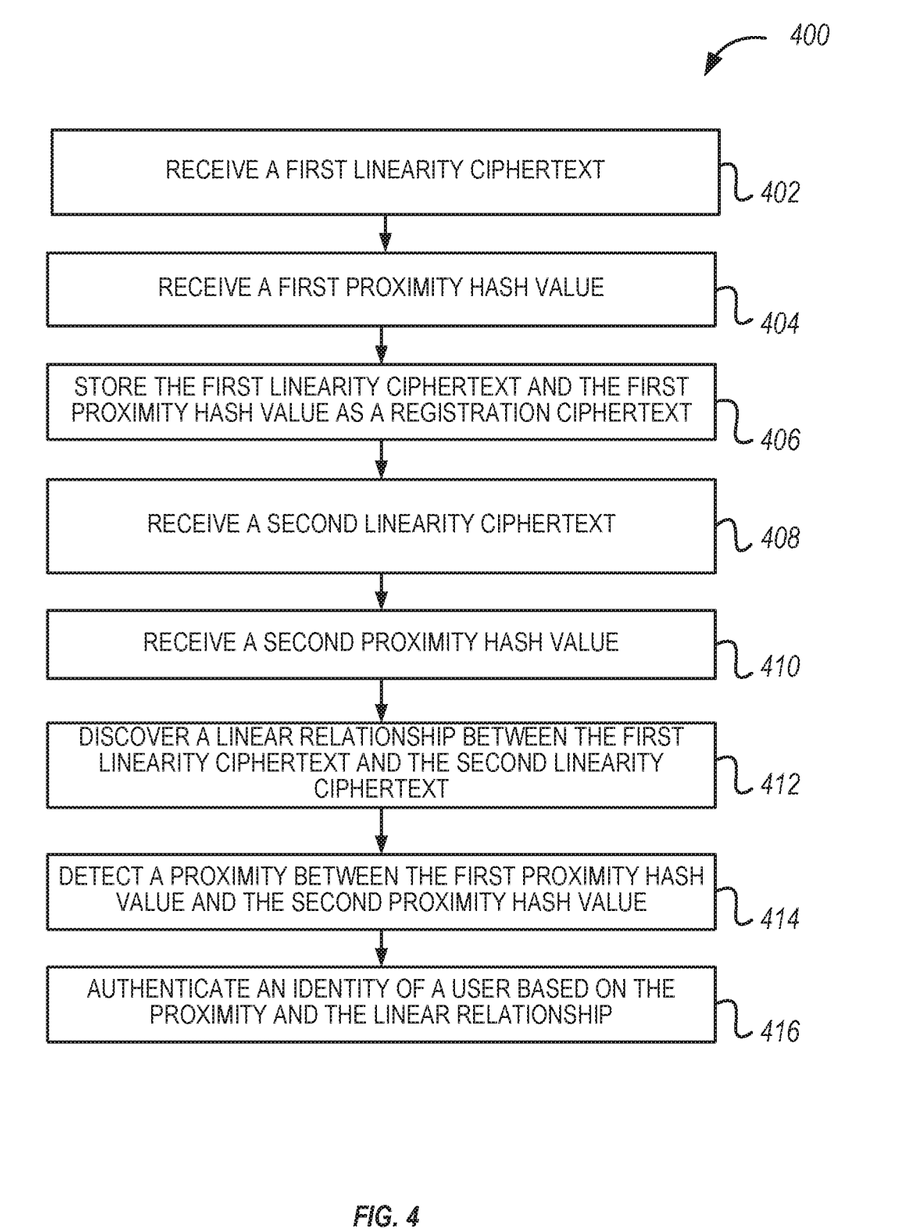
FIG. 4 is a flow diagram of an example method of biometric authentication, all in accordance with at least one embodiment described in this disclosure.

FIG. 4 is a flow diagram of an example method 400 of biometric authentication, arranged in accordance with at least one embodiment described herein. The method 400 may be performed in a biometric authentication system such as the biometric system 200 of FIG. 2 or in the operating environment 100 of FIG. 1. The method 400 may be programmably performed in some embodiments by the authentication server 140 described herein. The authentication server 140 may include or may be communicatively coupled to a non-transitory computer-readable medium (e.g., the memory 122 of FIG. 1 or the memory 308 of FIG. 3) having stored thereon or encoded therein programming code or instructions that are executable by a processor to perform or control performance of the method 400. Additionally or alternatively, the authentication server 140 may include a processor (e.g., the processor 304 of FIG. 3) that is configured to execute computer instructions to perform or control performance of the method 400. Although illustrated as discrete blocks, various blocks may be divided into additional blocks, combined into fewer blocks, or eliminated, depending on the desired implementation.

The method 400 may begin at block 402. At block 402, a first linearity ciphertext may be received. The first linearity ciphertext may be received by an authentication server. For example, with reference to FIG. 1, the user device 102 may communicate the first linearity ciphertext to the authentication server 140. The first linearity ciphertext may represent a first biometric template, which may be sampled from a high min-entropy distribution.

The first biometric template may be encrypted using a relational linearity encryption scheme. The relational linearity encryption scheme may be based on linear relational hash that is based on LPN. Additionally, the relational linearity encryption scheme may additionally be based on an IND_CCA secure public key encryption scheme. The IND_CCA secure public key encryption scheme may include a key generation algorithm (Keygen-CPA), an encryption algorithm (EncCPA), and a decryption algorithm (DecCPA).

At block 404, a first proximity hash value may be received. The first proximity hash value may be received by an authentication server. For example, with reference to FIG. 1, the user device 102 may communicate the first proximity hash value to the authentication server 140. The first proximity hash value may represent the first biometric template encrypted using a relational proximity hash scheme. The relational proximity hash scheme may be based on the relational linearity encryption scheme and an ECC.

At block 406, the first linearity ciphertext and/or the first proximity hash value may be stored as a registration ciphertext. For example, the first linearity ciphertext and/or the first proximity hash value may be stored in a memory of an authentication server such as the memory 122 of the authentication server 140.

At block 408, a second linearity ciphertext may be received. The second linearity ciphertext may represent a second biometric template, which may be sampled from a high min-entropy distribution. The second biometric template may be encrypted using the relational linearity encryption scheme. The first linearity ciphertext and/or the second linearity ciphertext may be encrypted according to linearity bit vector encryption expressions described elsewhere in this disclosure.

At block 410, a second proximity hash value may be received. The second proximity hash value may represent the second biometric template encrypted using the relational proximity encryption scheme. In some embodiments, the first proximity hash value and/or the second proximity hash value are generated according to proximity encryption expressions described elsewhere in this disclosure.

At block 412, a linearity relationship between the first linearity ciphertext and the second linearity ciphertext may be discovered. The linearity relationship may be discovered using a linearity relational secret key. In some embodiments, the discovering the linearity relationship may be performed according to a verification algorithm described elsewhere in this disclosure. Additionally, in some embodiments, the discovering may be performed using only AND gates and OR gates.

At block 414, a proximity between the first proximity hash value and the second proximity hash value may be detected. The proximity may be determined in terms of a Hamming distance. In some embodiments, the detecting the proximity may be performed according to proximity verification algorithms described elsewhere in this disclosure. Additionally, in some embodiments, detecting may be performed using only AND gates and OR gates. At block 418, an identity of a user may be authenticated based on the proximity and the linearity relationship.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

As used herein, the terms "module," "component," and/or "engine" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the invention.

What is claimed is:

1. A method comprising:
receiving a first linearity ciphertext that represents a first biometric template that is encrypted using a relational linearity encryption scheme that is based at least partially on learning parity with noise (LPN);
receiving a second linearity ciphertext that represents a second biometric template that is encrypted using the relational linearity encryption scheme;
discovering a linearity relationship between the first linearity ciphertext and the second linearity ciphertext using a linearity relational secret key;
receiving a first proximity hash value that represents the first biometric template that is encrypted using a relational proximity hash scheme, the relational proximity hash scheme being based on the relational linearity encryption scheme and an error correcting code (ECC);
receiving a second proximity hash value that represents the second biometric template that is encrypted using the relational proximity hash scheme;
detecting a proximity between the first proximity hash value and the second proximity hash value in terms of a Hamming distance; and
authenticating an identity of a user based on the proximity and the linearity relationship.

2. The method of claim 1, wherein the relational linearity encryption scheme is further based on an IND_CCA secure public key encryption scheme that includes a key generation algorithm, an encryption algorithm, and a decryption algorithm.

3. The method of claim 2, wherein the discovering the linearity relationship is performed according to a verification algorithm:

$skRlin := (A, \tau, sk\_3)$;

given cy, cx, z, and skRlin:
check an inequality:

$dist(DecCPA(sk\_3, cx\_0) + DecCPA(sk\_3, cy\_0) + A \times z) < 2 \times \tau \times m)$, in which:
cy represents the first linearity ciphertext,
cx represents the second linearity ciphertext,
skRlin represents a linearity relational secret key,
z represents a particular value chosen by a verifier entity, A represents a random binary matrix having dimensions of a first integer by a second integer,
$\tau$ represents a noise probability,
sk_3 represents a secret key of a IND_CCA secure public key encryption scheme,
cx_0 represents a first element of the first linearity ciphertext,
cy_0 represents a first element of the second linearity ciphertext,
DecCPA represents the decryption algorithm,
dist represents a Hamming distance operator, and
m represents the first integer.

4. The method of claim 3, wherein the first linearity ciphertext is encrypted according to linearity bit vector encryption expressions:

$m1 = \langle m1_i \rangle_{i=1}^n \in F_2^n$;

$cx := EncCPA(pk\_3, A \times m1 \, XOR \, e1), EncCPA(pk\_1, m1)$; and $e1 \in F^2_m$ w/each element=1 with probability $\tau$, else 0, in which:
e1 represents an output of the $Ber_\tau^q$ function that outputs a q-bit number in which each entry is a '1' with a probability T or a '0' otherwise,
m1 represents the first message of n bits,
pk_3 represents a public key of the IND_CCA secure public key encryption scheme,
pk_1 represents another public key of the IND_CCA secure public key encryption scheme,
i represents an indexing variable;
n represents the dimension of a first field;
EncCPA represents the encryption algorithm,
XOR represents a bit-wise XOR operator, and
$F_2$ represents a field with a base-number of 2.

5. The method of claim 4, wherein the noise probability is equal to about 0.25.

6. The method of claim 1, wherein the first biometric template is sampled from a high min-entropy distribution.

7. The method of claim 1, wherein the detecting a proximity is performed according to proximity verification algorithms:

$Z_{rs} = DECODE(DecCPA(skcpa, cx\_1 + DecCPA(skcpa, cy\_1))$; and $Output = \begin{cases} \text{reject, if DECODE return } \bot \\ VerifyLinear(skRlin, cx\_2, cy\_2, X \circ Z) \end{cases}$;

in which:
$Z_{rs}$ represents a randomness sum,
DECODE represents an ECC decoding operator,
DecCPA represents a decryption algorithm of an IND_CCA secure public key encryption scheme,
cx_1 represents a second element of the first linearity ciphertext,
cy_1 represents a second element of the second linearity ciphertext,
cx_2 represents a third element of the first linearity ciphertext,
cy_2 represents a third element of the second linearity ciphertext,
skRlin represents a relational linearity key, X represents a random matrix having a dimension of n×k in which n represents the dimension of the first biometric template and k represents the rank of the ECC, skcpa represents CPA secret key generated by a key generation algorithm of an IND-CCA secure public key encryption scheme, ⊥ represents an error, z represents a particular value chosen by a verifier entity, and VerifyLinear represents a linearity verification algorithm.

8. The method of claim 1, wherein the first proximity hash value is generated according to proximity encryption expressions:

$$cxp1:=EncCPA(pk(PA,m1+ENCODE(r));$$

$$cxp2:=EncXLinear(pkxlin,X \circ r); \text{ and}$$

$$cxp:=(cxp1,cxp2),$$

in which:
cxp represents the first proximity hash value,
cxp1 represents a first part of the first proximity hash value,
cxp2 represents a second part of the first proximity hash value,
EncCPA represents an encryption algorithm of an IND_CCA secure public key encryption scheme,
m1 represents the first biometric template,
pkCPA represents a CPA public key generated by a key generation algorithm of an IND-CCA secure public key encryption scheme,
ENCODE represents an ECC encoding operator,
r represents a proximity random number,
X represents a random matrix having a dimension of n×k in which n represents the dimension of the first biometric template and k represents the rank of the ECC, and
EncXLinear represents a first linearity encryption algorithm.

9. The method of claim 1, wherein the discovering and the detecting is performed using only AND gates and OR gates.

10. The method of claim 1, further comprising storing the first linearity ciphertext and a first proximity ciphertext as a registration ciphertext.

11. A non-transitory computer-readable medium having encoded therein programming code executable by a processor to perform or control performance of operations comprising:
receiving a first linearity ciphertext that represents a first biometric template that is encrypted using a relational linearity encryption scheme that is based at least partially on learning parity with noise (LPN);
receiving a second linearity ciphertext that represents a second biometric template that is encrypted using the relational linearity encryption scheme;
discovering a linearity relationship between the first linearity ciphertext and the second linearity ciphertext using a linearity relational secret key;
receiving a first proximity hash value that represents the first biometric template that is encrypted using a relational proximity hash scheme, the relational proximity hash scheme being based on the relational linearity encryption scheme and an error correcting code (ECC);
receiving a second proximity hash value that represents the second biometric template that is encrypted using the relational proximity hash scheme;
detecting a proximity between the first proximity hash value and the second proximity hash value in terms of a Hamming distance; and
authenticating an identity of a user based on the proximity and the linearity relationship.

12. The non-transitory computer-readable medium of claim 11, wherein the relational linearity encryption scheme is further based on an IND_CCA secure public key encryption scheme that includes a key generation algorithm, an encryption algorithm, and a decryption algorithm.

13. The non-transitory computer-readable medium of claim 12, wherein the discovering the linearity relationship is performed according to a verification algorithm:

$$skRlin:=(A,\tau,sk\_3);$$

given cy, cx, z, and skRlin:
check an inequality:

$$dist(DecCPA(sk\_3,cx\_0)+DecCPA(sk\_3,cy\_0)+A \times z) < 2 \times \tau \times m),$$

in which:
cy represents the first linearity ciphertext,
cx represents the second linearity ciphertext,
skRlin represents a linearity relational secret key,
z represents a particular value chosen by a verifier entity,
A represents a random binary matrix having dimensions of a first integer by a second integer,
τ represents a noise probability,
sk_3 represents a secret key of a IND_CCA secure public key encryption scheme,
cx_0 represents a first element of the first linearity ciphertext,
cy_0 represents a first element of the second linearity ciphertext,
DecCPA represents the decryption algorithm,
dist represents a Hamming distance operator, and
m represents the first integer.

14. The non-transitory computer-readable medium of claim 13, wherein the first linearity ciphertext is encrypted according to linearity bit vector encryption expressions:

$$m1 = \langle m1_i \rangle_{i=1}^n \in F_2^n;$$

$$cx:=EncCPA(pk\_3,A \times m1 XOR e1),EncCPA(pk\_1,m1);$$
and $$e1 \in F_2^m \text{ w/each element}=1 \text{ with probability } \tau, \text{ else } 0,$$
in which:

e1 represents an output of the $Ber_\tau^q$ function that outputs a q-bit number in which each entry is a '1' with a probability τ or a '0' otherwise,
m1 represents the first message of n bits,
pk_3 represents a public key of the IND_CCA secure public key encryption scheme,
pk_1 represents another public key of the IND_CCA secure public key encryption scheme,
i represents an indexing variable;
n represents the dimension of a first field;
EncCPA represents the encryption algorithm,
XOR represents a bit-wise XOR operator, and
$F_2$ represents a field with a base-number of 2.

15. The non-transitory computer-readable medium of claim 14, wherein the noise probability is equal to about 0.25.

16. The non-transitory computer-readable medium of claim 11, wherein the first biometric template is sampled from a high min-entropy distribution.

17. The non-transitory computer-readable medium of claim 11, wherein the detecting a proximity is performed according to proximity verification algorithms:

$$Z_{rs} := \text{DECODE}(DecCPA(skcpa, cx\_1 + DecCPA(skcpa, cy\_0)); \text{ and}$$

$$\text{Output} = \begin{cases} \text{reject, if DECODE return } \bot \\ VerifyLinear(skRlin, cx\_2, cy\_2, X \circ Z) \end{cases};$$

in which:
 $Z_{rs}$ represents a randomness sum,
 DECODE represents an ECC decoding operator,
 DecCPA represents a decryption algorithm of an IND-CCA secure public key encryption scheme,
 cx_1 represents a second element of the first linearity ciphertext,
 cy_1 represents a second element of the second linearity ciphertext,
 cx_2 represents a third element of the first linearity ciphertext,
 cy_2 represents a third element of the second linearity ciphertext,
 skRlin represents a relational linearity key,
 X represents a random matrix having a dimension of n×k in which n represents the dimension of the first biometric template and k represents the rank of the ECC,
 skcpa represents CPA secret key generated by a key generation algorithm of an IND-CCA secure public key encryption scheme,
 $\bot$ represents an error,
 z represents a particular value chosen by a verifier entity, and
 VerifyLinear represents a linearity verification algorithm.

18. The non-transitory computer-readable medium of claim 11, wherein the first proximity hash value is generated according to proximity encryption expressions:

$$cxp1 := EncCPA(pkCPA, m1 + \text{ENCODE}(r));$$

$$cxp2 := EncXLinear(pkxlin, X \circ r); \text{ and}$$

$$cxp := (cxp1, cxp2),$$

in which:
 cxp represents the first proximity hash value,
 cxp1 represents a first part of the first proximity hash value,
 cxp2 represents a second part of the first proximity hash value,
 EncCPA represents an encryption algorithm of an IND-CCA secure public key encryption scheme,
 m1 represents the first biometric template,
 pkCPA represents a CPA public key generated by a key generation algorithm of an IND-CCA secure public key encryption scheme,
 ENCODE represents an ECC encoding operator,
 r represents a proximity random number,
 X represents a random matrix having a dimension of n×k in which n represents the dimension of the first biometric template and k represents the rank of the ECC, and
 EncXLinear represents a first linearity encryption algorithm.

19. The non-transitory computer-readable medium of claim 11, wherein the discovering and the detecting is performed using only AND gates and OR gates.

20. The non-transitory computer-readable medium of claim 11, wherein the operations further comprise storing the first linearity ciphertext and a first proximity ciphertext as a registration ciphertext.

* * * * *